(12) United States Patent
Kennedy (10) Patent No.: US 7,976,105 B2
(45) Date of Patent: Jul. 12, 2011

(54) DOUBLE CYLINDER ASSEMBLY FOR RAISING AND LOWERING A DUMP TRUCK TAILGATE

(75) Inventor: Gregg L. Kennedy, Cleveland, OK (US)

(73) Assignee: Air Power Systems Co., Inc., Tulsa, OK (US)

( * ) Notice: Subject to any disclaimer, the term of this patent is extended or adjusted under 35 U.S.C. 154(b) by 403 days.

(21) Appl. No.: 12/171,321

(22) Filed: Jul. 11, 2008

(65) Prior Publication Data

US 2009/0146488 A1    Jun. 11, 2009

Related U.S. Application Data

(60) Provisional application No. 60/959,394, filed on Jul. 13, 2007.

(51) Int. Cl.
*B60P 1/26* (2006.01)

(52) U.S. Cl. .................................. 298/23 MD; 298/23 R (58) Field of Classification Search ................. 298/23 R, 298/23 MD, 23 M; 296/56
See application file for complete search history.

(56) References Cited

U.S. PATENT DOCUMENTS 3,447,700 A * 6/1969 Nickel

* cited by examiner

*Primary Examiner* — Stephen Gordon
(74) *Attorney, Agent, or Firm* — MacMillan, Sobanski & Todd, LLC (57) ABSTRACT

A mechanism raises and lowers a tailgate provided on a dump box of a dump truck, trailer, or similar vehicle. The dump box has an open end and is supported on the frame for movement between a lowered position for storing and transporting items and a raised position for dumping the items out of the dump box. A tailgate is supported on the bump box for movement between a closed position, wherein the tailgate closes the open rear end of the dump box, and an opened position, wherein the tailgate is spaced away from the open end of the dump box. A double cylinder assembly extends between the dump box and the tailgate for selectively moving the tailgate between the closed and opened positions.

20 Claims, 9 Drawing Sheets

DOUBLE CYLINDER ASSEMBLY FOR RAISING AND LOWERING A DUMP TRUCK TAILGATE

CROSS-REFERENCE TO RELATED APPLICATIONS

This application claims the benefit of U.S. Provisional Application No. 60/959,394, filed Jul. 13, 2007, the disclosure of which is incorporated herein by reference.

BACKGROUND OF THE INVENTION

This invention relates in general to mechanisms for raising and lowering a tailgate provided on a dump box of a dump truck, trailer, or similar vehicle. In particular, this invention relates to a double cylinder assembly for raising and lowering such a tailgate that is pivotably supported on the dump box.

A typical dump truck includes a dump box that is movable (usually by pivoting) between a lowered position (for storing and transporting items) and a raised position (for dumping the items out of the dump box). A typical dump box includes a floor, a pair of side walls, a front wall, and an open rear end for accomplishing this function. Frequently, the open rear end of the dump box includes a pair of upstanding corner posts that are each formed from a hollow rectangular member. A tailgate is supported on the side walls of the dump box adjacent to the open rear end for pivoting movement between a closed position (wherein the tailgate closes the open rear end of the dump box for facilitating the storing and transporting of the items therein) and an opened position (wherein the tailgate is pivoted away from the open rear end of the dump box for facilitating the dumping of the items out of the dump box).

In many instances, the tailgate is affirmatively moved between the opened and closed positions by means of a cylinder (typically a pneumatic cylinder) that extends between the dump box and the tailgate. When the cylinder is extended, the tailgate is pivoted away from the open rear end of the dump box to the opened position. When the cylinder is retracted, the tailgate is pivoted toward the open rear end of the dump box to the closed position. In this manner, the operation of the cylinder controls the movement of the tailgate between the opened and closed positions.

In the past, the cylinder has typically been provided on the dump truck in one of two locations. In a first generally vertical orientation, a cylinder has been located within either or both of the hollow upstanding corner posts provided on the open rear end of the dump box. This generally vertical orientation is desirable because it does not expand the overall width of the vehicle, which can be limited by practical considerations or by regulation. However, the internal space that is available within each of these corner posts is limited, thus limiting the size of the cylinder that can be provided within each of the corner posts (and, as a result, the amount of force that is available to move the tailgate between the opened and closed positions) is relatively limited. In a second generally horizontal orientation, a cylinder has been located on the outside of either or both of the side walls of the dump box. This generally horizontal orientation is desirable because it is simple and inexpensive to install. However, as mentioned above, it does undesirably expand the overall width of the vehicle. Thus, it would be desirable to provide an improved mechanism for raising and lowering a tailgate provided on a dump box of a dump truck, trailer, or similar vehicle that avoids these problems.

SUMMARY OF THE INVENTION

This invention relates in general to an improved mechanism for raising and lowering a tailgate provided on a dump box of a dump truck, trailer, or similar vehicle. The dump box has an open end and is supported on the frame for movement between a lowered position for storing and transporting items and a raised position for dumping the items out of the dump box. A tailgate is supported on the bump box for movement between a closed position, wherein the tailgate closes the open rear end of the dump box, and an opened position, wherein the tailgate is spaced away from the open end of the dump box. A double cylinder assembly extends between the dump box and the tailgate for selectively moving the tailgate between the closed and opened positions.

Various aspects of this invention will become apparent to those skilled in the art from the following detailed description of the preferred embodiments, when read in light of the accompanying drawings.

DETAILED DESCRIPTION OF THE PREFERRED EMBODIMENTS

Figure 1:
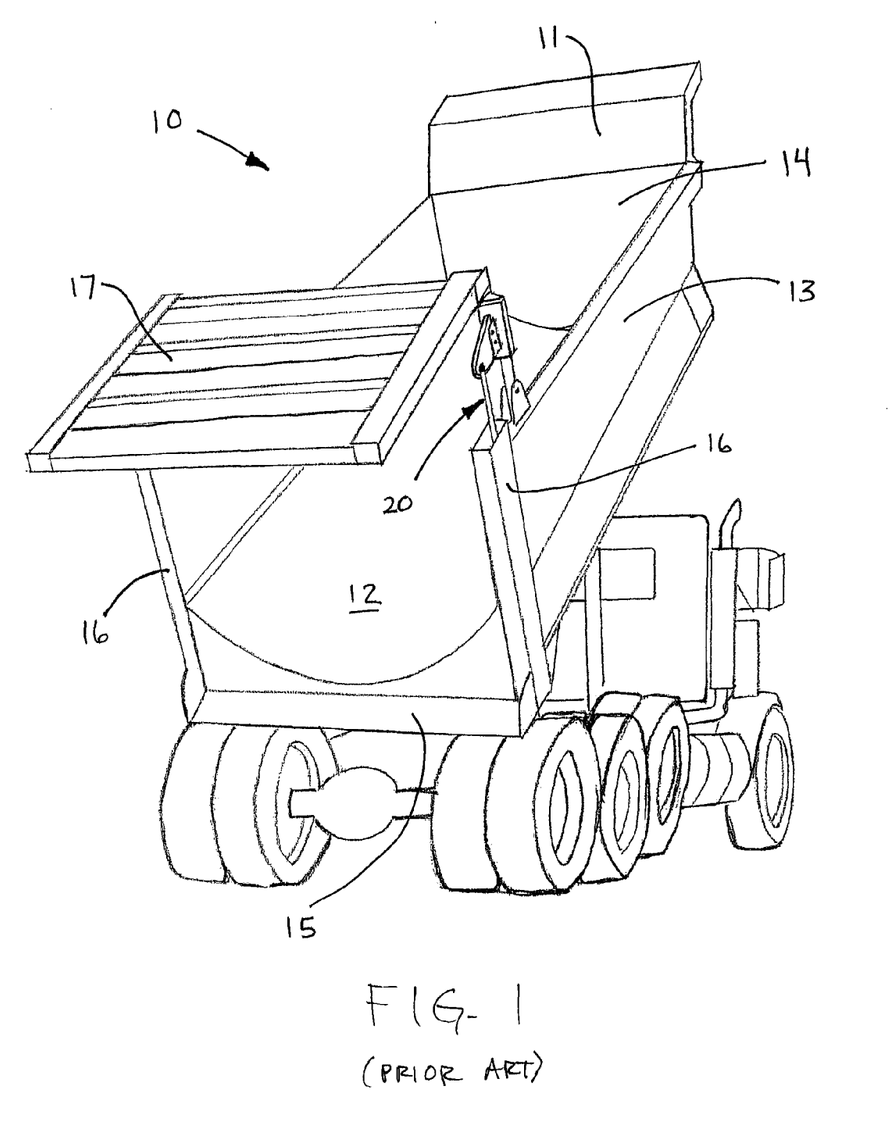
FIG. 1 is a perspective view of a prior art dump truck including a conventional single cylinder assembly.

Referring now to the drawings, there is illustrated in FIG. 1 a dump truck, indicated generally at 10, including a frame that supports a prior art dump box 11 that is pivotable between a lowered position (for storing and transporting items) and a raised position (for dumping the items out of the dump box 11). The prior art dump box 11 includes a floor 12, a pair of side walls 13, a front wall 14, and an open rear end 15. The open rear end 15 of the prior art dump box 11 has a pair of upstanding corner posts 16 that are each formed from a hollow rectangular member. A tailgate 17 is supported on the side walls 13 of the prior art dump box 11 adjacent to the open rear end 15 for pivoting movement between a closed position (wherein the tailgate 17 closes the open rear end 15 of the prior art dump box 11) and an opened position (wherein the tailgate 17 is spaced away from the open rear end 15 of the prior art dump box 11, as shown in FIG. 1). The tailgate 17 is moved between the opened and closed positions by means of one or more single cylinders that, as described above, have been secured to the dump truck 10 in one of two locations.

Figure 2:
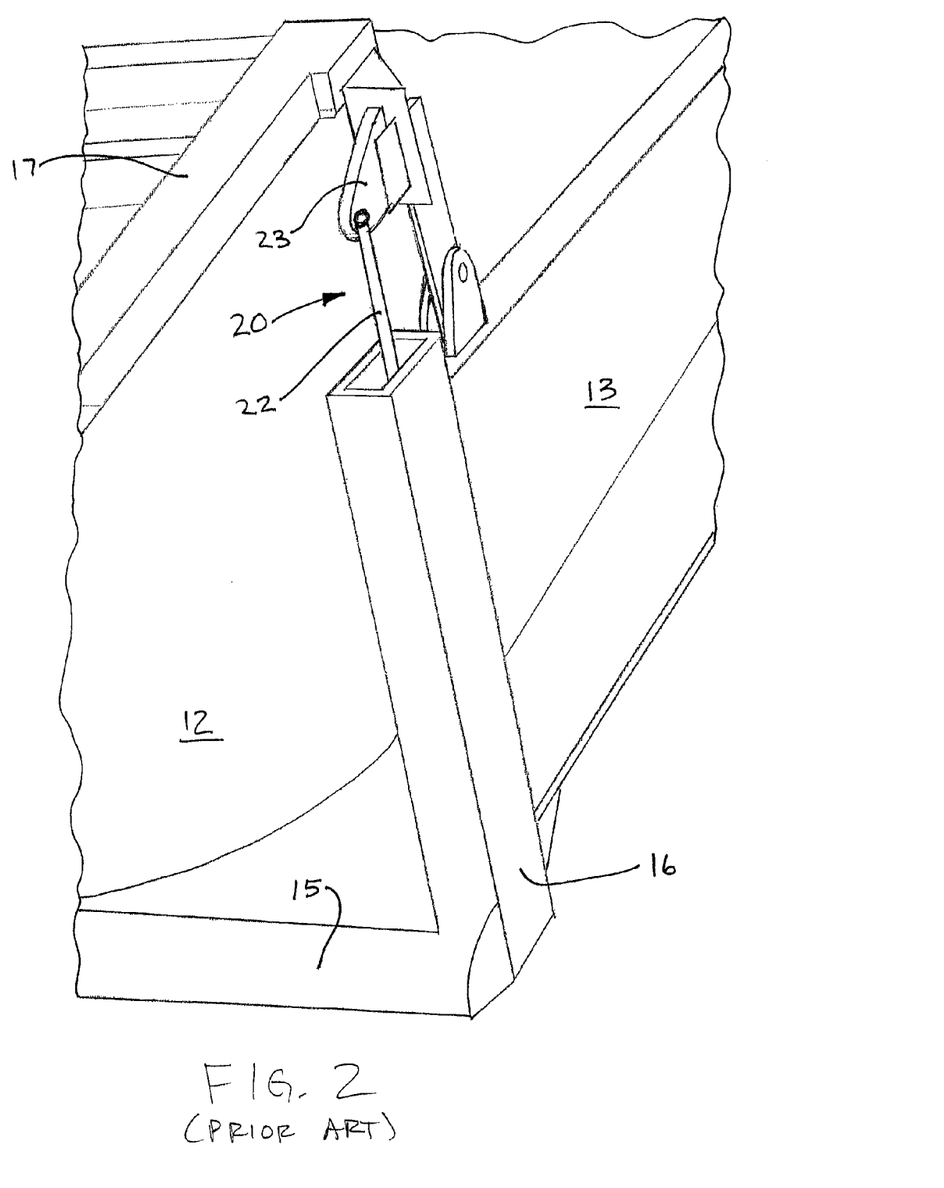
FIG. 2 is an enlarged perspective view of a portion of the prior art dump truck illustrated in FIG. 1.
Figure 3:
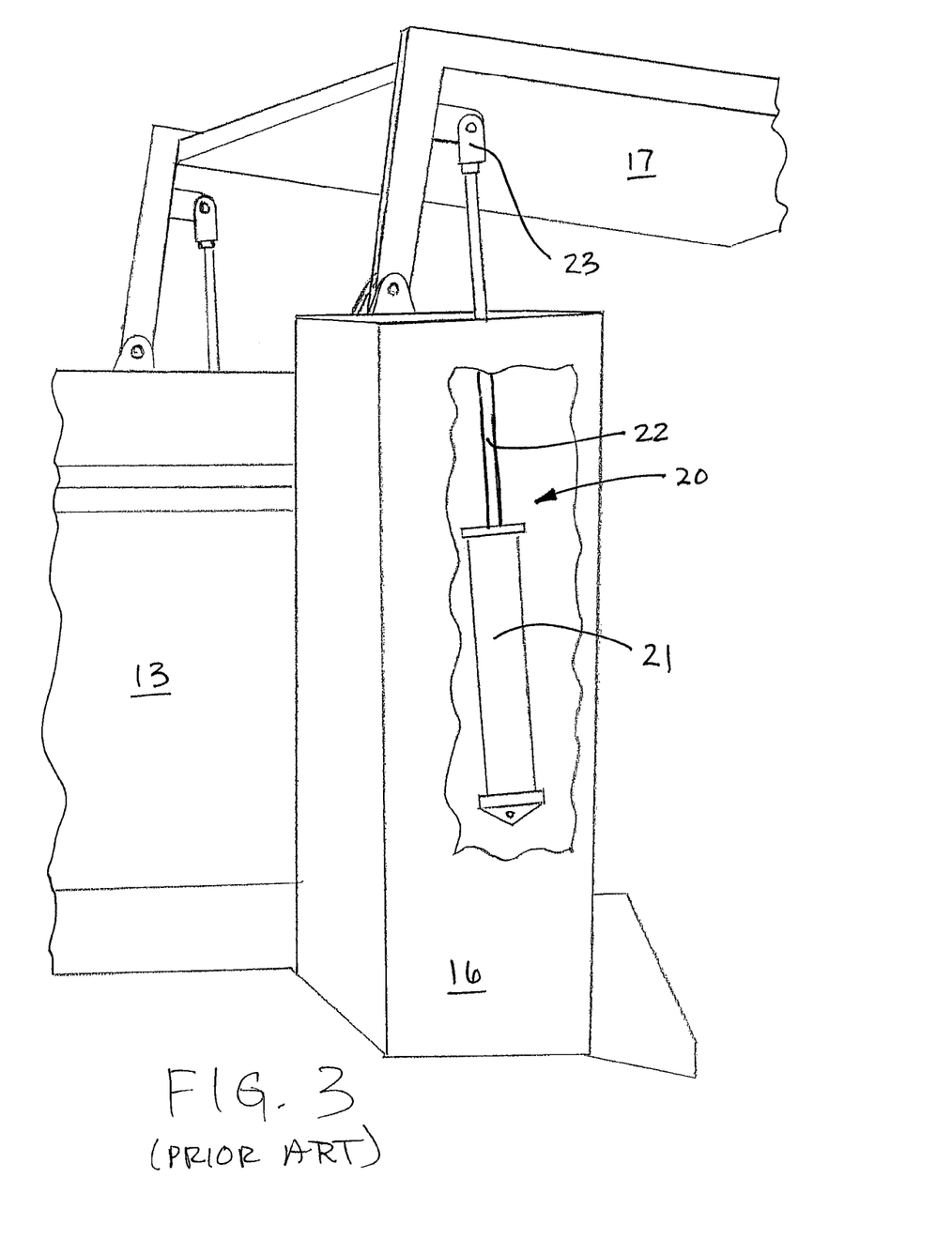
FIG. 3 is a further enlarged perspective view, partially broken away, of a portion of the prior art dump truck illustrated in FIGS. 1 and 2.

As more clearly shown in FIGS. 2 and 3, a conventional single cylinder assembly, indicated generally at 20, is provided in a vertical orientation within each of the hollow rectangular beams of the corner posts 16 of the prior art dump box 11, as described above. As shown therein, each of the conventional single cylinder assemblies 20 includes a single cylinder 21. The single cylinder 21 is conventional in the art and may be embodied as a hydraulically or pneumatically actuated cylinder. The single cylinder 21 has a piston rod 22 associated therewith. As is well known in the art, the piston rod 21 can be extended from or retracted within the single cylinder 21 as desired. The end of the piston rod 22 is connected through a yoke 23 to the tailgate 17 of the prior art dump box 11.

To open the tailgate 17 of the prior art dump box 11, the single cylinder assembly 20 is actuated in a conventional manner to extend the piston rod 22 from the cylinder 21. As a result, the tailgate 17 of the prior art dump box 11 is caused to pivot from a closed position to an opened position. To close the tailgate 17 of the dump box 11, the single cylinder assembly 20 is actuated in a conventional manner to retract the piston rod 22 within the cylinder 21. As a result, the tailgate 17 of the prior art dump box 11 is caused to pivot from the opened position to the closed position.

Figure 4:
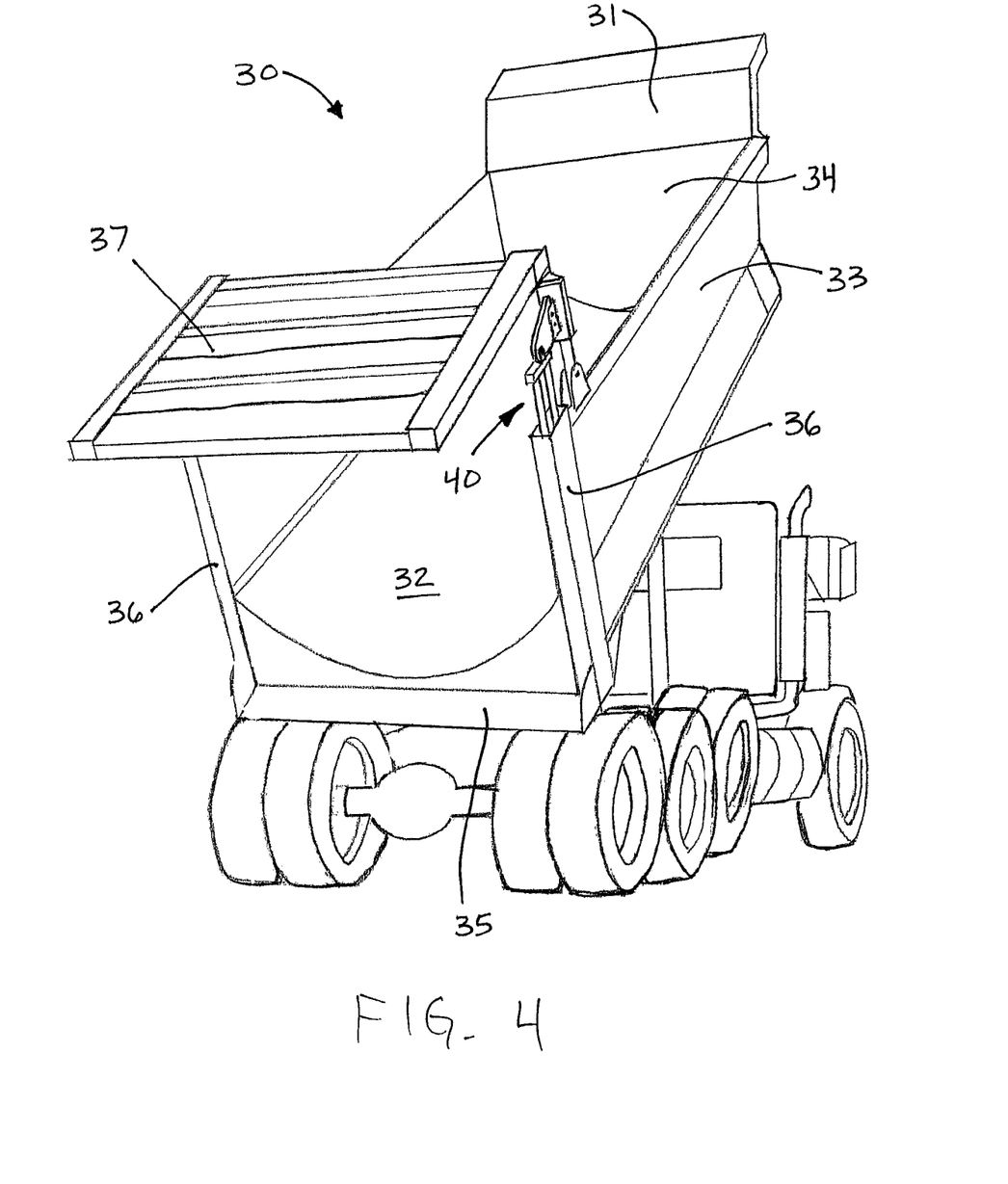
FIG. 4 is a perspective view of a dump truck including a first embodiment of a double cylinder assembly in accordance with this invention.
Figure 5:
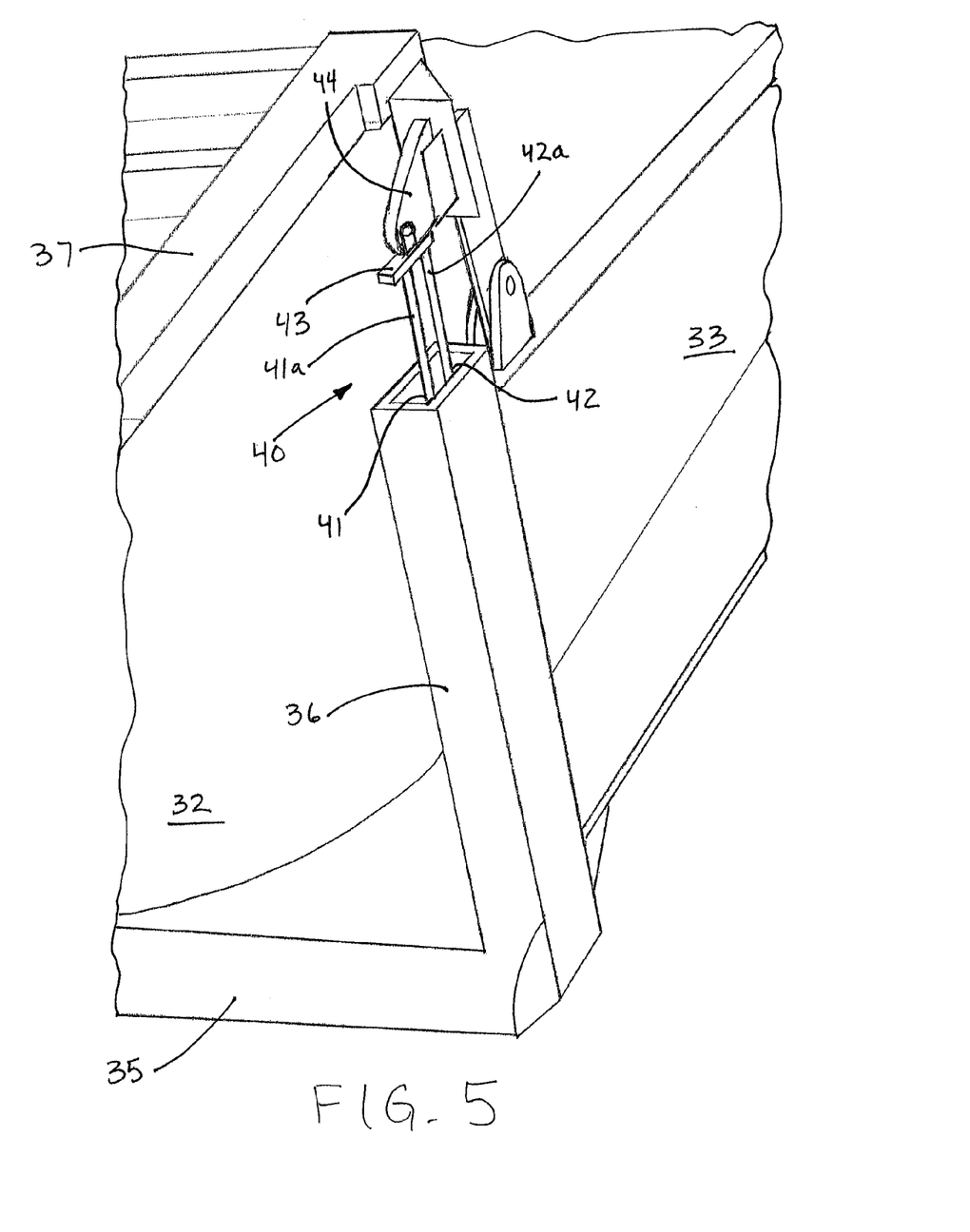
FIG. 5 is an enlarged perspective view of a portion of the dump truck illustrated in FIG. 4.
Figure 6:
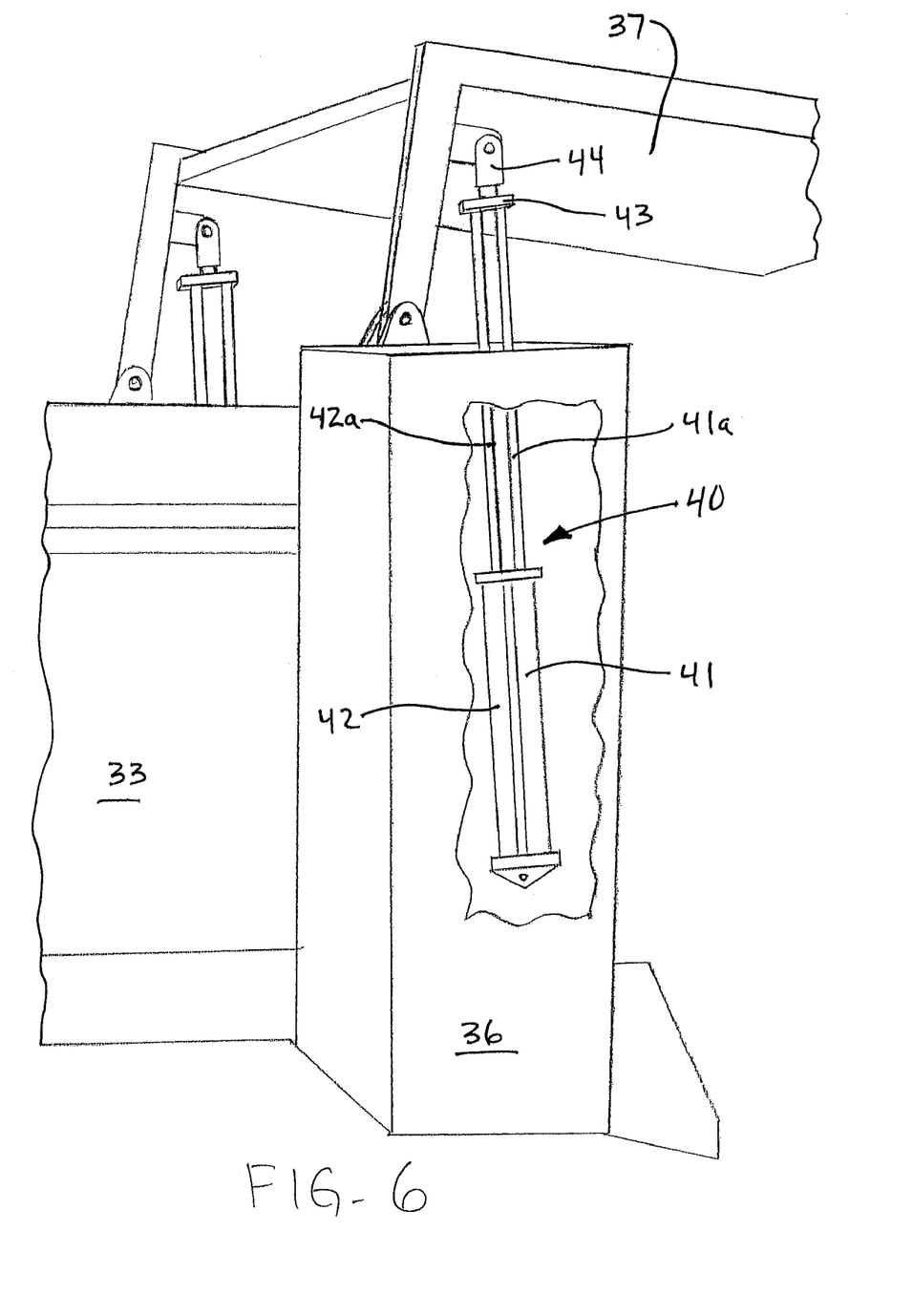
FIG. 6 is a further enlarged perspective view, partially broken away, of a portion of the dump truck illustrated in FIGS. 4 and 5.

Referring now to FIGS. 4, 5, and 6, there is illustrated a dump truck, indicated generally at 30, in accordance with a first embodiment of this invention. The dump truck 30 includes a frame supporting a dump box 31 that is pivotable between a lowered position (for storing and transporting items) and a raised position (for dumping the items out of the dump box 31). The dump box 31 includes a floor 32, a pair of side walls 33, a front wall 34, and an open rear end 35. The open rear end 35 of the dump box 31 has a pair of upstanding corner posts 36 that are each formed from a hollow rectangular member. A tailgate 37 is supported on the side walls 33 of the dump box 31 adjacent to the open rear end 35 of the dump box 31 for pivoting movement between a closed position (wherein the tailgate 37 closes the open rear end 35 of the dump box 31) and an opened position (wherein the tailgate 37 is spaced away from the open rear end 35 of the dump box 31, as shown in FIG. 4).

Figure 7:
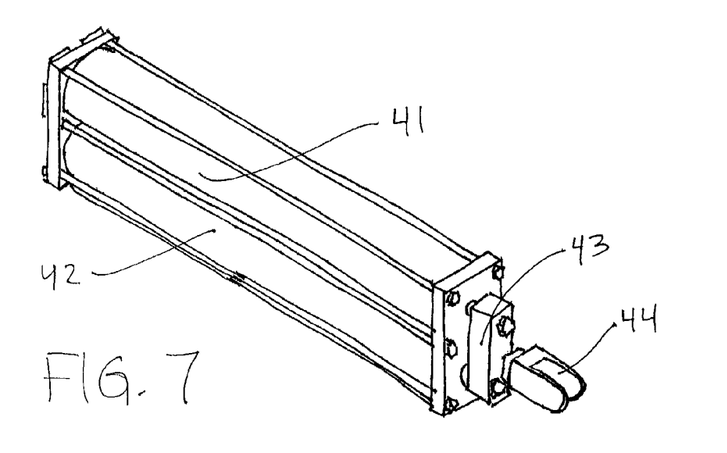
FIG. 7 is a further enlarged perspective view of the double cylinder assembly illustrated in FIGS. 4, 5, and 6 shown in a retracted position.
Figure 8:
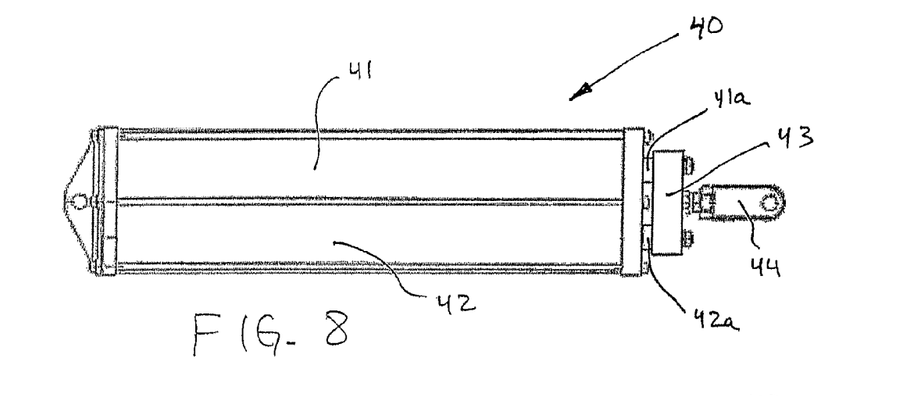
FIG. 8 is a side elevational view of the double cylinder assembly illustrated in FIG. 7.
Figure 9:
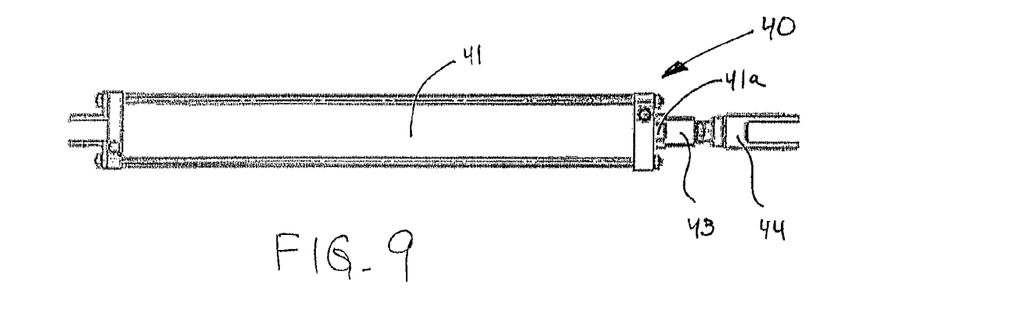
FIG. 9 is a top plan view of the double cylinder assembly illustrated in FIGS. 7 and 8.
Figure 10:
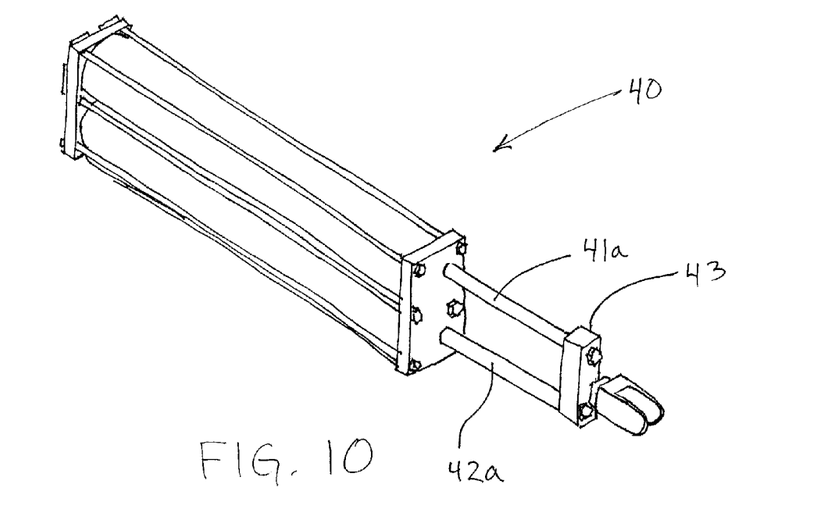
FIG. 10 is a perspective view similar to FIG. 7 showing the double cylinder assembly in an extended position.
Figure 11:
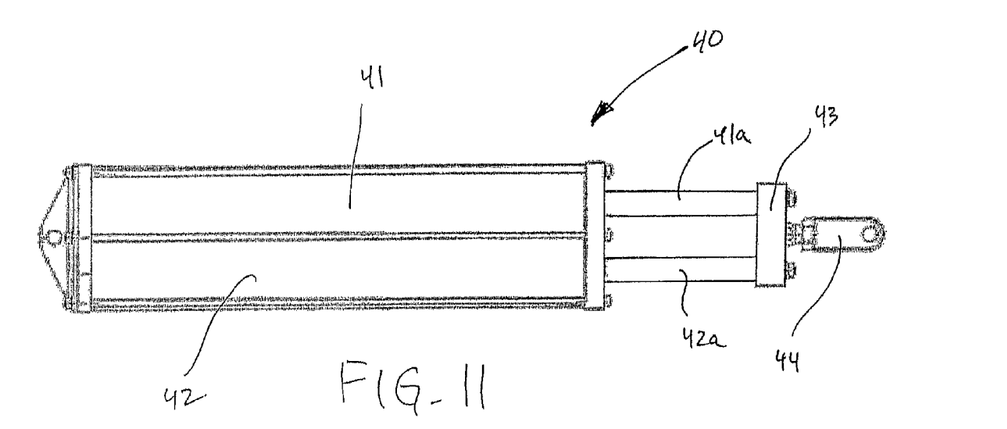
FIG. 11 is a side elevational view similar to FIG. 8 showing the double cylinder assembly in an extended position.

A double cylinder assembly, indicated generally at 40, is provided within each of the hollow rectangular members of the corner posts 36 of the dump box 31 for moving the tailgate 37 between the opened and closed positions. The structure of one of the double cylinder assemblies 40 is illustrated in detail in FIGS. 7 through 11. As shown therein, each of the double cylinder assemblies 40 includes first and second cylinders 41 and 42 that are disposed adjacent to one another. The first and second cylinders 41 and 42 are, of themselves, conventional in the art and may be embodied as hydraulically or pneumatically actuated cylinders. Each of the first and second cylinders 41 and 42 has a respective piston rod 41a and 42a associated therewith. As is well known in the art, the piston rods 41a and 42a can be extended from or retracted within the associated first and second cylinders 41 and 42 as desired. The piston rods 41a and 42a are connected to a cross bar 43 for concurrent extending and retracting movement. The cross bar 43 is connected to a yoke 44 that, in turn, is connected to the tailgate 37 of the dump box 31. As best shown in FIG. 7, each of the double cylinder assemblies 40 is generally rectangular in shape when viewed from each end thereof.

To open the tailgate 37 of the dump box 31, the double cylinder assemblies 40 are actuated in a conventional manner to extend the piston rods 41a and 42a from the respective first and second cylinders 41 and 42. As a result, the cross bar 43 and the yoke 44 are similarly extended, causing the tailgate 37 of the dump box 31 to pivot from a closed position to an opened position. To close the tailgate 37 of the dump box 1131, the double cylinder assemblies 40 are actuated in a conventional manner to retract the piston rods 41a and 42a within the respective first and second cylinders 41 and 42. As a result, the cross bar 43 and the yoke 44 are similarly retracted, causing the tailgate 37 of the dump box 31 to pivot from the opened position to the closed position.

The two double cylinder assemblies 40 fit more efficiently within the respective hollow rectangular shape of the corner posts 36 than a conventional single pneumatic cylinder having a square or circular cross sectional shape. Therefore, the two double cylinder assemblies 40 provide more force than the single pneumatic cylinder could provide for a given size of the corner posts 36.

Figure 12:
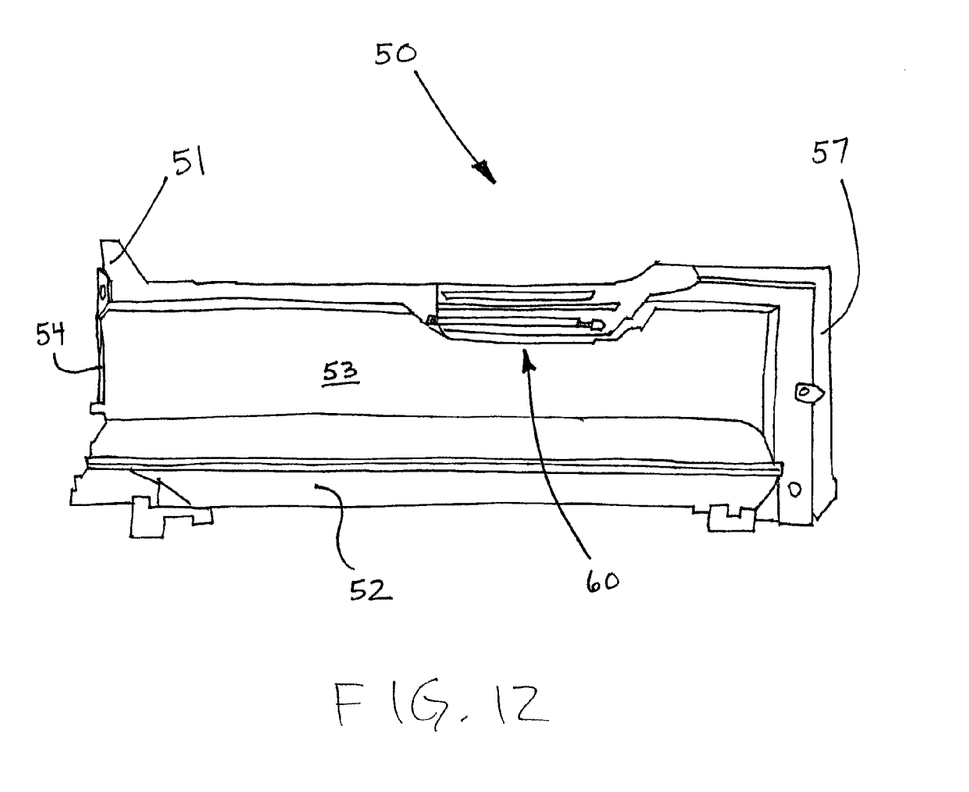
FIG. 12 is a side elevational view of a dump truck including a second embodiment an alternate embodiment of a double cylinder assembly in accordance with this invention.

Referring now to FIG. 12, there is illustrated a dump box, indicated generally at 50, in accordance with a second embodiment of this invention. The dump truck 50 includes a dump box 51 that is pivotable between a lowered position (for storing and transporting items) and a raised position (for dumping the items out of the dump box 51). The dump box 51 includes a floor 52, a pair of side walls 53 (only one of which is shown in FIG. 12), a front wall 54, and an open rear end (not shown in FIG. 12). A tailgate 57 is supported on the side walls 53 of the dump box 51 adjacent to the open rear end 55 of the dump box 51 for pivoting movement between a closed position (wherein the tailgate 57 closes the open rear end 55 of the dump box 51) and an opened position (wherein the tailgate 57 is spaced away from the open rear end 55 of the dump box 51. A double cylinder assembly, indicated generally at 60, is provided on either or both of the side walls 53 of the dump box 51. The structure and manner of operation of the double cylinder assemblies 60 can be the same as described above in connection with FIGS. 7 through 11.

The principle and mode of operation of this invention have been explained and illustrated in its preferred embodiments. However, it must be understood that this invention may be practiced otherwise than as specifically explained and illustrated without departing from its spirit or scope.

What is claimed is:

1. An apparatus comprising:
    a dump box having an open end;
    a tailgate supported on the dump box for movement between a closed position, wherein the tailgate closes the open end of the dump box, and an opened position, wherein the tailgate is spaced away from the open end of the dump box; and
    a double cylinder assembly that extends between the dump box and the tailgate for selectively moving the tailgate between the closed and opened positions; wherein either
    (1) the dump box includes a corner post that is formed from a hollow rectangular member and the double cylinder assembly is disposed within the corner post, or
    (2) the double cylinder assembly includes first and second cylinders that are disposed adjacent to one another, each of the first and second cylinders has a respective piston rod associated therewith, the piston rods are connected to a cross bar for concurrent extending and retracting movement, and the cross bar is connected to a yoke that, in turn, is connected to the tailgate of the dump box.

2. The apparatus defined in claim 1 wherein the dump box includes a corner post that is formed from a hollow rectangular member, and wherein the double cylinder assembly is disposed within the corner post.

3. The apparatus defined in claim 1 wherein the dump box includes a pair of corner posts that are each formed from a hollow rectangular member, and wherein a double cylinder assembly is disposed within each of the pair of corner posts.

4. The apparatus defined in claim 1 wherein the dump box includes a floor, a pair of side walls, a front wall, and the open end, and wherein the double cylinder assembly extends between one of the pair of side walls of the dump box and the tailgate.

5. The apparatus defined in claim 1 wherein the dump box includes a floor, a pair of side walls, a front wall, and the open end, and wherein a double cylinder assembly extends between each of the pair of side walls of the dump box and the tailgate.

6. The apparatus defined in claim 1 wherein the double cylinder assembly includes first and second cylinders that are disposed adjacent to one another.

7. The apparatus defined in claim 6 wherein each of the first and second cylinders has a respective piston rod associated therewith.

8. The apparatus defined in claim 7 wherein the piston rods are connected to a cross bar for concurrent extending and retracting movement.

9. The apparatus defined in claim 8 wherein the cross bar is connected to a yoke that, in turn, is connected to the tailgate of the dump box.

10. The apparatus defined in claim 1 wherein the double cylinder assembly is generally rectangular in shape when viewed from an end thereof.

11. A vehicle comprising:
    a frame;
    a dump box having an open end, the dump box being supported on the frame for movement between a lowered position for storing and transporting items and a raised position for dumping the items out of the dump box;
    a tailgate supported on the dump box for movement between a closed position, wherein the tailgate closes the open end of the dump box, and an opened position, wherein the tailgate is spaced away from the open end of the dump box; and
    a double cylinder assembly that extends between the dump box and the tailgate for selectively moving the tailgate between the closed and opened positions; wherein either
    (1) the dump box includes a corner post that is formed from a hollow rectangular member and the double cylinder assembly is disposed within the corner post, or
    (2) the double cylinder assembly includes first and second cylinders that are disposed adjacent to one another, each of the first and second cylinders has a respective piston rod associated therewith, the piston rods are connected to a cross bar for concurrent extending and retracting movement, and the cross bar is connected to a yoke that, in turn, is connected to the tailgate of the dump box.

12. The vehicle defined in claim 11 wherein the dump box includes a corner post that is formed from a hollow rectangular member, and wherein the double cylinder assembly is disposed within the corner post.

13. The vehicle defined in claim 11 wherein the dump box includes a pair of corner posts that are each formed from a hollow rectangular member, and wherein a double cylinder assembly is disposed within each of the pair of corner posts.

14. The vehicle defined in claim 11 wherein the dump box includes a floor, a pair of side walls, a front wall, and the open end, and wherein the double cylinder assembly extends between one of the pair of side walls of the dump box and the tailgate.

15. The vehicle defined in claim 11 wherein the dump box includes a floor, a pair of side walls, a front wall, and the open end, and wherein a double cylinder assembly extends between each of the pair of side walls of the dump box and the tailgate.

16. The vehicle defined in claim 11 wherein the double cylinder assembly includes first and second cylinders that are disposed adjacent to one another.

17. The vehicle defined in claim 16 wherein each of the first and second cylinders has a respective piston rod associated therewith.

18. The vehicle defined in claim 17 wherein the piston rods are connected to a cross bar for concurrent extending and retracting movement.

19. The vehicle defined in claim 18 wherein the cross bar is connected to a yoke that, in turn, is connected to the tailgate of the dump box.

20. The vehicle defined in claim 11 wherein the double cylinder assembly is generally rectangular in shape when viewed from an end thereof.

\* \* \* \* \*